United States Patent
Kiernan et al.

(10) Patent No.: US 10,883,640 B2
(45) Date of Patent: Jan. 5, 2021

(54) FLUID COUPLINGS, SYSTEMS, AND METHODS

(71) Applicant: Eaton Corporation, Cleveland, OH (US)

(72) Inventors: Gregory Kiernan, Grass Lake, MI (US); Devashish Murkya, Pune (IN); Jason C. Gauss, Jackson, MI (US); Christopher T. Cantrell, Jackson, MI (US)

(73) Assignee: Eaton Intelligent Power Limited, Dublin (IE)

( * ) Notice: Subject to any disclaimer, the term of this patent is extended or adjusted under 35 U.S.C. 154(b) by 494 days.

(21) Appl. No.: 15/631,692

(22) Filed: Jun. 23, 2017

(65) Prior Publication Data

US 2017/0370511 A1    Dec. 28, 2017

Related U.S. Application Data

(60) Provisional application No. 62/354,459, filed on Jun. 24, 2016, provisional application No. 62/467,966, filed on Mar. 7, 2017.

(51) Int. Cl.
| | |
|---|---|
| *F16L 19/00* | (2006.01) |
| *F16L 37/113* | (2006.01) |
| *F16L 37/10* | (2006.01) |
| *F16L 21/08* | (2006.01) |
| *F16L 21/03* | (2006.01) |

(52) U.S. Cl.
CPC ............. *F16L 37/113* (2013.01); *F16L 21/03* (2013.01); *F16L 21/08* (2013.01); *F16L 37/101* (2013.01); *F16L 19/005* (2013.01); *F16L 2201/10* (2013.01)

(58) Field of Classification Search
CPC .................................................... F16L 19/005
See application file for complete search history.

(56) References Cited

U.S. PATENT DOCUMENTS

| | | | |
|---|---|---|---|
| 4,244,608 A | | 1/1981 | Stuemky |
| 4,927,192 A | * | 5/1990 | Ungchusri .......... F16L 19/0231 |
| | | | 285/305 |

(Continued)

FOREIGN PATENT DOCUMENTS

| | | | |
|---|---|---|---|
| CA | 2779014 A1 | * | 5/2011 |
| CN | 102207017 B | | 3/2013 |

(Continued)

*Primary Examiner* — David Bochna
*Assistant Examiner* — James A Linford
(74) *Attorney, Agent, or Firm* — Fishman Stewart PLLC

(57) ABSTRACT

A coupling includes a male adapter and a female adapter, and may include a nut and a sleeve. In embodiments, the male adapter includes a male adapter inner diameter, and may include threads. The female adapter includes a female adapter outer diameter. The nut or other formation may be configured to engage at least a portion of the male adapter. In embodiments, one or more contact points may be provided between the female diameter outer diameter and the male adapter inner diameter, and the female adapter outer diameter or the male adapter inner diameter may be configured to be out-of-round. The male adapter may include a shoulder and the sleeve may cover the shoulder in connected configuration. Methods for forming a coupling are also disclosed.

16 Claims, 6 Drawing Sheets

(56) References Cited

U.S. PATENT DOCUMENTS

| | | | |
|---|---|---|---|
| 5,348,349 A * | 9/1994 | Sloane | F16L 19/005 |
| | | | 285/86 |
| 7,156,424 B2 | 1/2007 | McCord | |
| 7,222,889 B2 * | 5/2007 | Breay | F16L 19/005 |
| | | | 285/349 |
| 7,552,947 B2 | 6/2009 | Ryhman | |
| 8,038,181 B2 | 10/2011 | Marschall et al. | |
| 8,394,472 B2 | 3/2013 | Kertesz | |
| 8,888,140 B2 | 11/2014 | Stroempl et al. | |
| 9,073,078 B2 * | 7/2015 | Imagawa | F16L 19/005 |
| 9,103,479 B2 | 8/2015 | Kertesz et al. | |
| D738,470 S | 9/2015 | Eaton et al. | |
| 9,175,794 B2 | 11/2015 | Lewcun | |
| 9,366,370 B2 | 6/2016 | Courpet et al. | |
| 9,506,587 B2 | 11/2016 | Petit | |
| D777,299 S | 1/2017 | Eaton et al. | |
| 9,611,959 B2 | 4/2017 | Hartmann et al. | |
| 9,714,732 B2 | 7/2017 | Neiske | |
| 2007/0164566 A1 * | 7/2007 | Patel | F16L 19/005 |
| | | | 285/386 |
| 2010/0140920 A1 | 6/2010 | Kloss et al. | |
| 2010/0225108 A1 | 9/2010 | Mann | |
| 2010/0225109 A1 | 9/2010 | Swift et al. | |
| 2013/0056978 A1 | 3/2013 | Swift et al. | |
| 2013/0161941 A1 | 6/2013 | Zulauf et al. | |
| 2013/0257046 A1 | 10/2013 | Henrich et al. | |
| 2014/0069621 A1 | 3/2014 | Mann et al. | |
| 2015/0000096 A1 | 1/2015 | Gilbreath | |
| 2015/0028587 A1 * | 1/2015 | Marc | F16L 19/005 |
| | | | 285/354 |
| 2015/0176732 A1 | 6/2015 | Courpet et al. | |
| 2015/0184781 A1 | 7/2015 | Espinosa Sanchez et al. | |
| 2015/0198278 A1 | 7/2015 | Clements et al. | |
| 2015/0211668 A1 | 7/2015 | Campbell et al. | |
| 2015/0240687 A1 | 8/2015 | Mann | |
| 2015/0240693 A1 | 8/2015 | Birman et al. | |
| 2016/0069504 A1 | 3/2016 | Wollaston et al. | |
| 2016/0091126 A1 | 3/2016 | Gibson et al. | |
| 2016/0281887 A1 | 9/2016 | Dobmeier et al. | |
| 2016/0334040 A1 | 11/2016 | Ehrke et al. | |
| 2017/0040717 A1 | 2/2017 | Le Quere | |
| 2017/0268706 A1 | 9/2017 | Schippers et al. | |

FOREIGN PATENT DOCUMENTS

| | | | |
|---|---|---|---|
| CN | 102192380 B | | 11/2013 |
| DE | 102008049959 B4 | | 1/2013 |
| DE | 102008048040 B4 | | 3/2013 |
| DE | 102009011864 B4 | | 7/2013 |
| DE | 102005049271 B4 | | 10/2016 |
| EP | 1571385 A2 | * | 9/2005 |
| EP | 1681504 B1 | | 2/2013 |
| EP | 1829663 B1 | | 5/2013 |
| EP | 2439439 B1 | | 9/2013 |
| EP | 2106515 B1 | | 4/2014 |
| EP | 2510271 B1 | | 5/2014 |
| EP | 2837868 A1 | | 2/2015 |
| EP | 2860387 A1 | | 4/2015 |
| EP | 2873899 A1 | | 5/2015 |
| EP | 2479469 B1 | | 6/2016 |
| EP | 3124848 A1 | | 2/2017 |
| FR | 2973094 B3 | | 3/2013 |
| GB | 1349039 A | * | 3/1974 |
| WO | WO-9509317 A1 | * | 4/1995 |
| WO | WO-2006031386 A2 | * | 3/2006 |
| WO | WO-2015181235 A1 | | 12/2015 |
| WO | WO-2016023798 A1 | | 2/2016 |
| WO | WO-2017008923 A1 | | 1/2017 |

* cited by examiner

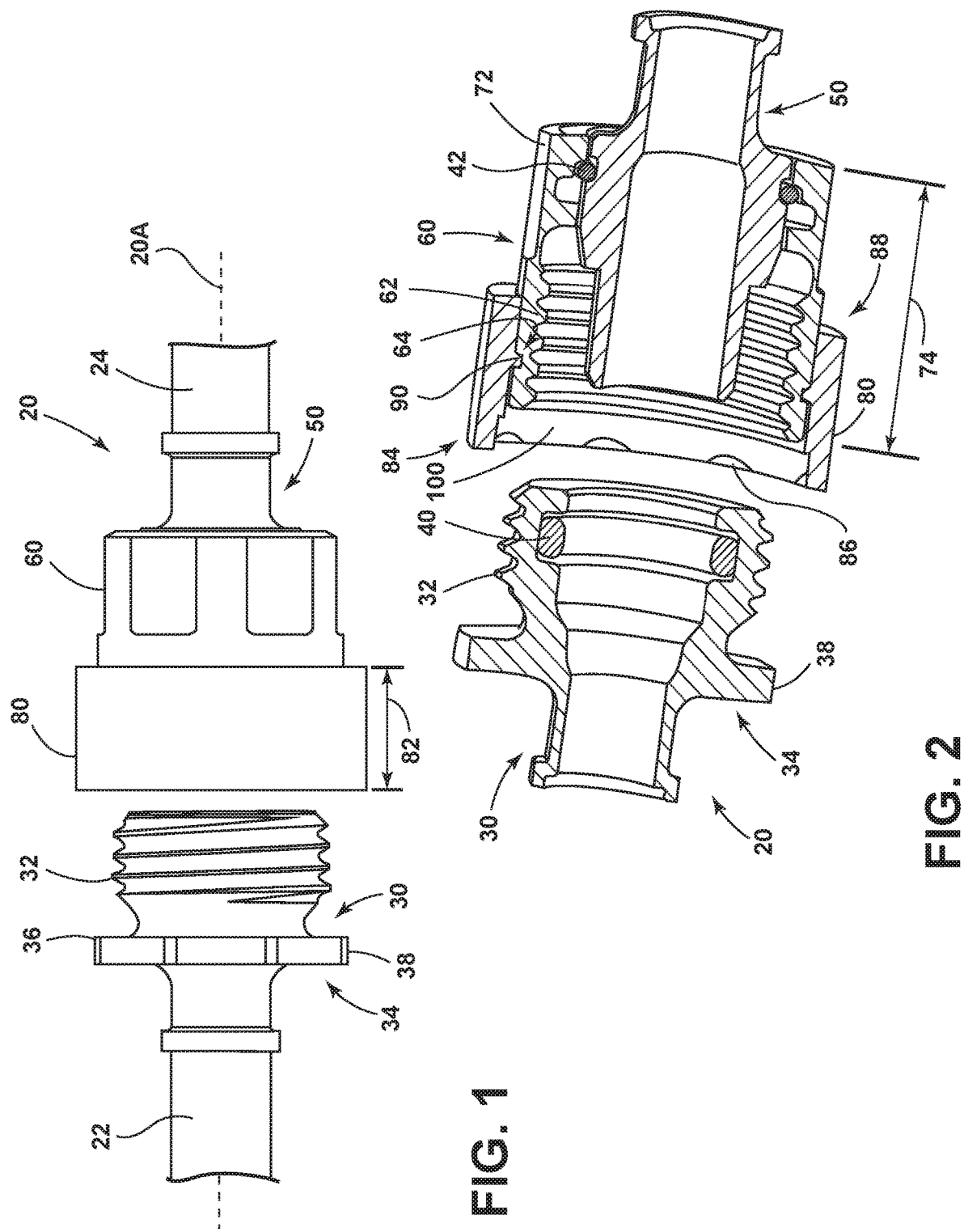

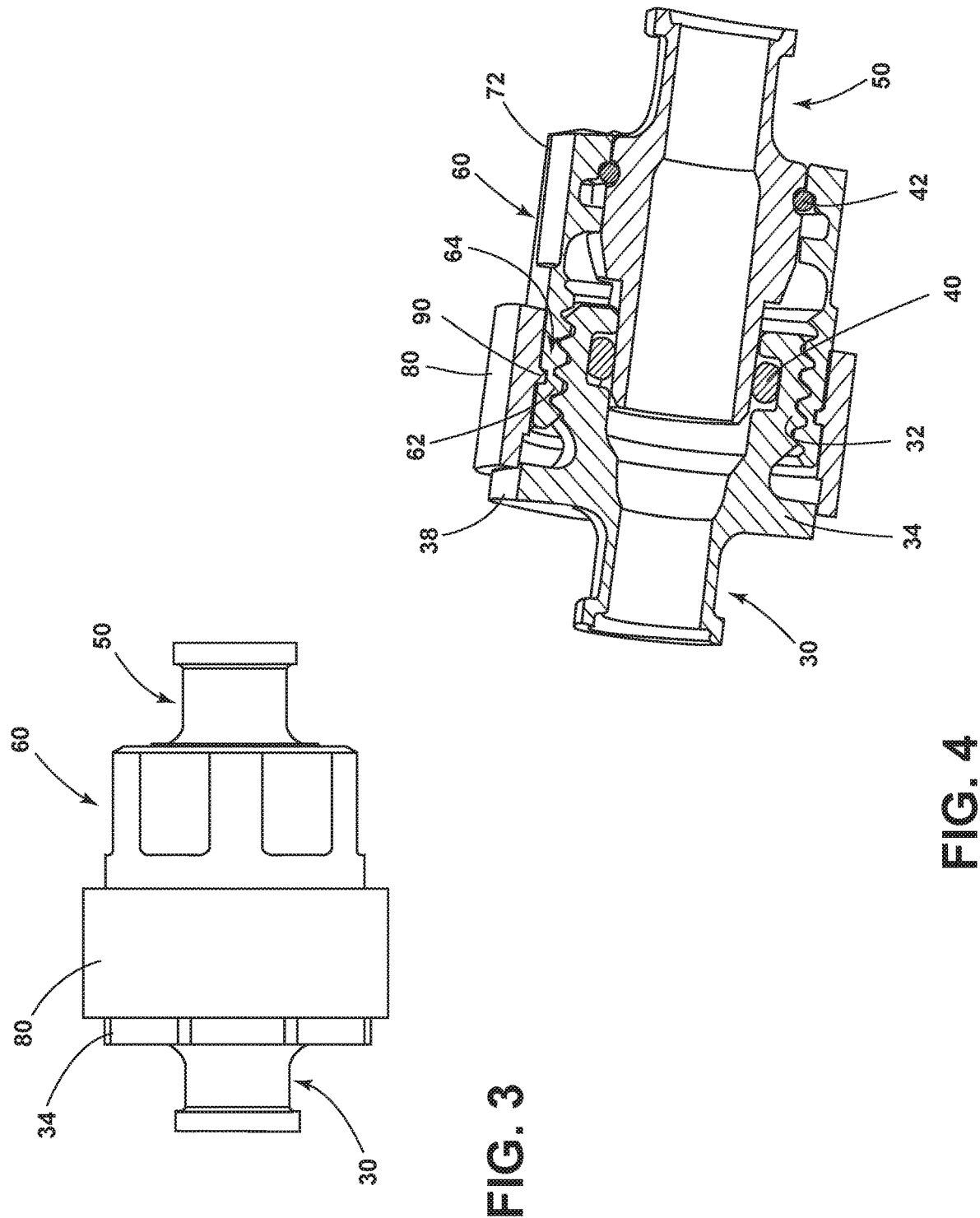

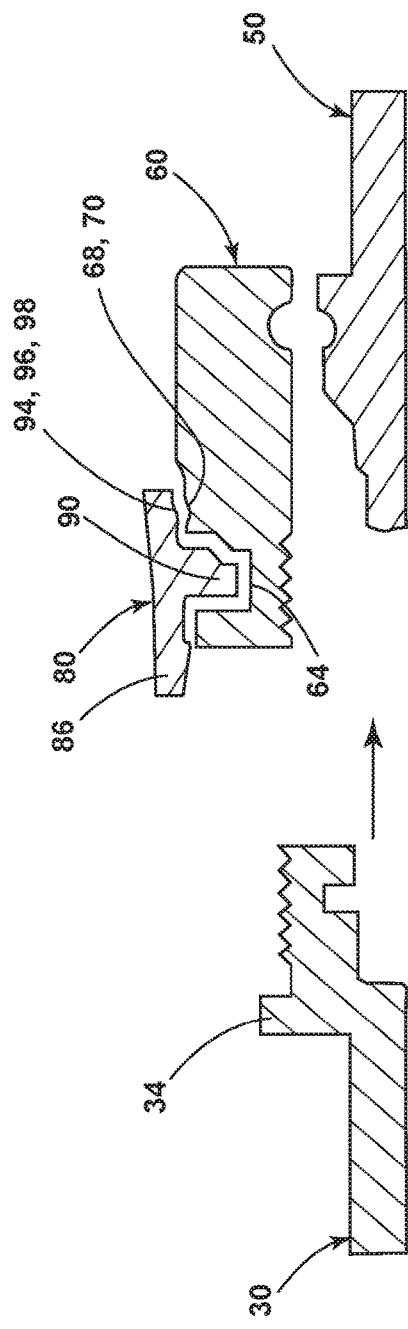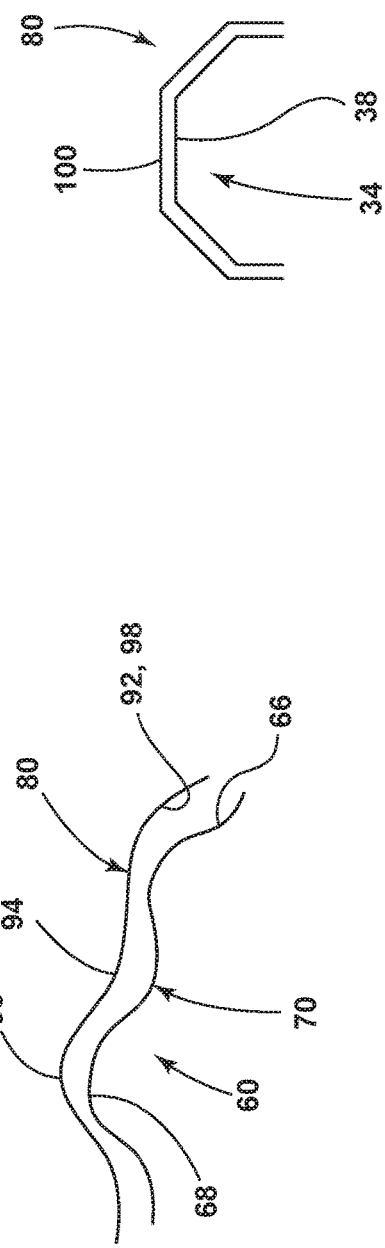

FLUID COUPLINGS, SYSTEMS, AND METHODS

CROSS-REFERENCE TO RELATED APPLICATIONS

This application claims the benefit of U.S. Provisional Patent Application Ser. No. 62/354,459, filed on Jun. 24, 2016 and U.S. Provisional Patent Application Ser. No. 62/467,966, filed on Mar. 7, 2017, the disclosures of which are hereby incorporated herein by reference in their entireties.

TECHNICAL FIELD

The present disclosure relates generally to fluid conveyance fittings and couplings, including systems and methods involving fluid conveyance fittings and couplings.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Fluid conveyance fittings/couplings, for example those used in aerospace applications, commonly have low conductivity requirements—e.g., approximately 10 milliohms. Conventional fittings that meet such requirements typically contain metal-to-metal seals that require significant installation force to function as intended. Challenges can arise when a fitting is designed for an application that requires low enough force to be connected by hand—i.e., without tooling. Contact force is commonly a significant factor in the conductivity for an interface, so without a significant input force during installation, meeting conductivity requirements can be challenging. Moreover, such fittings may be required to fully function as intended along a specified axial range of travel.

Examples of some fitting/coupling assemblies are generally described in U.S. Pat. Nos. 5,553,895, 5,570,910, 6,494,494, 6,592,151, and/or PCT Application PCT/US2016/043642, each of which is assigned to the assignee hereof and each of which is hereby incorporated by reference in its entirety as though fully set forth herein. Certain conventional fitting/coupling assemblies may be relatively large, heavy, difficult to assemble, and/or difficult to operate.

Among other things, it can be challenging to provide fittings and fitting systems that address one or more of the aforementioned challenges, such as allowing sufficient axial travel, maintaining adequate conductivity throughout that travel, and/or providing fittings or couplings that are compact, lightweight, and/or easy to assembly and operate.

SUMMARY

In embodiments, a fluid coupling may include a first member that may be configured for connection with a first fluid conduit and may include a shoulder, a second member that may be configured for connection with a second fluid conduit, a nut, and a sleeve that may be engaged with the nut and configured to cover the shoulder upon a complete connection of the first member with the second member.

In embodiments, a fluid coupling may include a first member including an outer diameter and a second member including an inner diameter. One or more contact points may be provided between the outer diameter and the inner diameter. In some embodiments, at least one of the outer diameter and the inner diameter may be out-of-round. In some embodiments, interference may involve a plurality of contact points that are substantially continuous (e.g., may comprise a substantially continuous ring). The first member may include threads. A nut or other component may comprise a conventional nut, or may comprise another component or formation that is configured to engage a portion (e.g., threads) of a first member. Methods for forming a fitting system are also disclosed.

The foregoing and other aspects, features, details, utilities, and/or advantages of embodiments the present disclosure will be apparent from reading the following description, and from reviewing the accompanying drawings.

BRIEF DESCRIPTION OF THE DRAWINGS

The present disclosure will now be described, by way of example, with reference to the accompanying drawings, wherein like reference numerals identify like components in the several figures, in which:

FIG. 1 is side view generally illustrating portions of an embodiment of an unconnected coupling, in accordance with teachings of the present disclosure.

FIG. 2 is a cross-sectional perspective view generally illustrating portions of an embodiment of an unconnected coupling, in accordance with teachings of the present disclosure.

FIG. 3 is side view generally illustrating portions of an embodiment of a partially connected coupling, in accordance with teachings of the present disclosure.

FIG. 4 is a cross-sectional perspective view generally illustrating portions of an embodiment of a partially connected coupling, in accordance with teachings of the present disclosure.

FIG. 8 is a cross-sectional view generally illustrating portions of an embodiment of a connected coupling, in accordance with teachings of the present disclosure.

FIG. 8A is a cross-sectional view generally illustrating portions of embodiments of a sleeve and a nut, in accordance with teachings of the present disclosure.

FIG. 8B is a cross-sectional view generally illustrating portions of embodiments of a sleeve and a shoulder, in accordance with teachings of the present disclosure.

DETAILED DESCRIPTION

Figure 6:
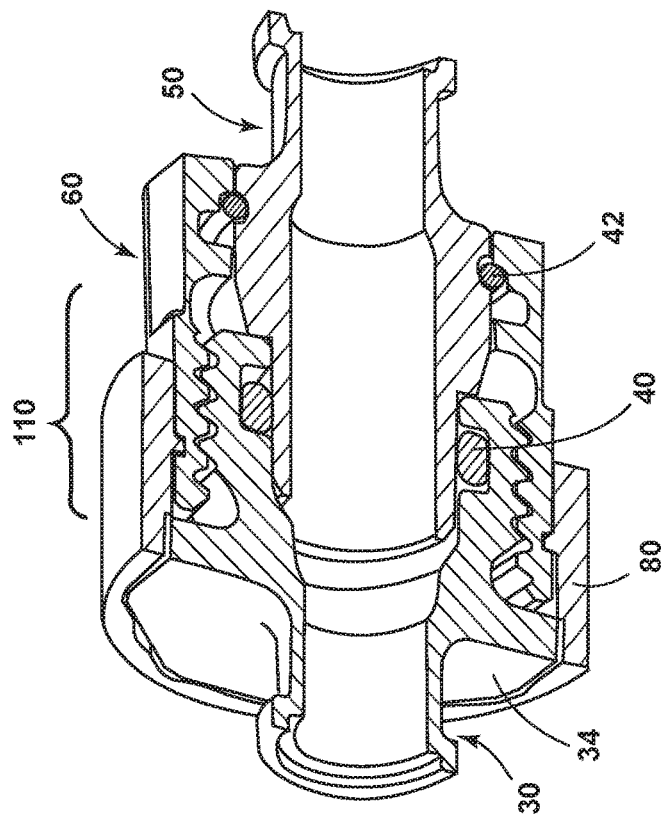
FIG. 6 is a cross-sectional perspective view generally illustrating portions of an embodiment of a connected coupling, in accordance with teachings of the present disclosure.
Figure 5:
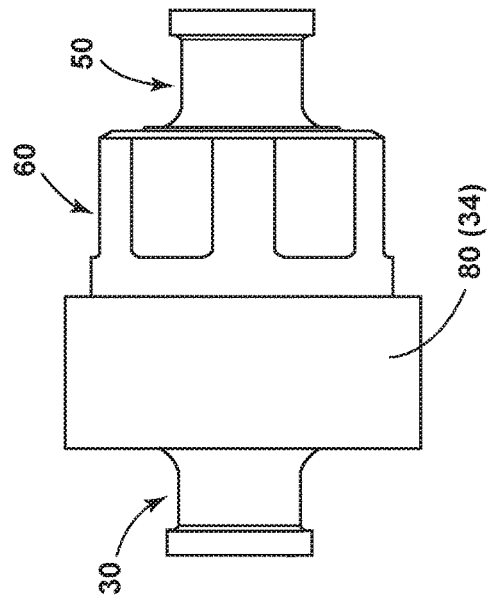
FIG. 5 is side view generally illustrating portions of an embodiment of a connected coupling, in accordance with teachings of the present disclosure.

Reference will now be made in detail to embodiments of the present disclosure, examples of which are described herein and illustrated in the accompanying drawings. While the disclosed concepts will be described in conjunction with embodiments, it will be understood that they are not intended to limit the disclosure to these embodiments. On the contrary, the disclosure is intended to cover alternatives, modifications, and equivalents.

Referring now to the drawings, FIGS. 1, 2, 3, 4, 5, 6, 7, 8, 8A, and 8B generally illustrate embodiments of couplings or fitting systems 20 (or "fitting assemblies" or "assemblies") that may be used, for example, with fluids. A coupling 20 may include a first member 30 (e.g., a male adapter), a second member 50 (e.g., a female adapter), a nut 60, and/or a sleeve 80. The coupling 20 may or may not include a ratchet ring and/or a sleeve spring. For example and without limitation, the first member 30, the second member 50, the nut 60, and/or the sleeve 80 may not be connected with a ratchet ring and/or a sleeve spring. Coupling 20 may include a longitudinal axis 20A. Coupling 20 may be configured for connecting a first fluid conduit 22 with a second fluid conduit 24. The first member 30 may be configured for connection with the first fluid conduit 22 and the second member 50 may be configured for connection with the second fluid conduit 24. A fluid conduit 22, 24 may include, for example and without limitation, a pipe, a tube, a reservoir, and/or a fluid conveyance or storage device.

With embodiments, the first member 30 may include threads 32 (e.g., external threads) that may be configured to engage threads 62 (e.g., internal threads) of the nut 60. The nut 60, the sleeve 80, and/or the second member 50 may be rotatably connected to each other. The sleeve 80 may include a relatively short axial length 82 compared to other designs, which may reduce a combined volume of the nut 60 and the sleeve 80. The axial length 82 of the sleeve 80 may be less than the axial length 74 of the nut 60. For example and without limitation, an axial length 82 of a sleeve 80 may be at least 40% less than an axial length 74 of the nut 60. The sleeve 80 may be configured to engage a mating profile of the first member (e.g., a shoulder 34), such as during installation. The coupling 20 may include a sealing member 40 that may provide a fluid seal between the first member 30 and the second member 50. The coupling may include a drive wire 42 that may connect the nut 60 with the second member 50.

In embodiments, the first member 30 may include a shoulder 34 that may act as a visual indicator. For example, and without limitation, upon achieving a complete connection, the shoulder 34 may not be visible and/or may be at least partially obscured (e.g., by axial movement of the sleeve 80 over/around the shoulder 34). If the shoulder 34 is visible (e.g., from a radial direction relative to axis 20A), the shoulder 34 may serve as an indication that connection is not complete. The shoulder 34 may include one or more features at its outer diameter/radial surface 38 that may make it more noticeable/visible when a connection is not complete. For example, and without limitation, the shoulder 34 may include certain coloring (e.g. red, yellow, etc.), coatings, materials, components, and/or other features, such as an O-ring indicator that may be different from and/or distinguish the shoulder 34 from other portions of the coupling 20.

With embodiments, during a connection or assembly process, a first/forward end 84 of the sleeve 80 may mate with the shoulder 34 of the first member 30. At least one of the sleeve 80 and the shoulder 34 may include a tapered portion or edge (e.g., tapered portions 36, 86) that may facilitate engagement between the sleeve 80 and the shoulder 34 (e.g., the sleeve 34 sliding over the shoulder 34). A second/aft end 88 of the sleeve 80 may be connected with and/or permitted to rotate, at least to some degree, relative to the nut 60. For example and without limitation, the sleeve 80 may be keyed with the nut 60, such as via a radially-extending circumferential flange 90 of the sleeve 80 engaged with a circumferential groove 64 of the nut 60. The flange 90 may be able rotate/slide within the groove 64, but the groove 64 may restrict axial movement of the flange 90 and the sleeve 80 relative to each other. A minimum rotational force to rotate the nut 60 may be bounded by a spline or sprocket feature of the nut 60 and the sleeve 80 (see, e.g., FIG. 8A). For example and without limitation, sleeve 80 may include an internal spline 92 (e.g., at or about sleeve aft end 88) that may be correspond to an external spline 66 of the nut 60. A profile of the spline(s) 66, 92 may be configured to ensure that anti-rotation of the nut 60 will not occur inadvertently during use. A spline profile may include, for example, a series of alternating curved protrusions 68, 94 and curved recesses 70, 96 disposed about a circumference of the sleeve 80 (e.g., at a sleeve inner surface 98) and/or the nut 60 (e.g., at a nut outer surface 72).

With embodiments, the sleeve 80 may be configured to completely/fully cover the shoulder 34, at least in a radial direction (e.g., have a sufficiently long axial length 82), if the nut 60 is completely connected with/threaded onto the first member 30 (e.g., bottoms out) and/or a connection between the first member 30 and the second member 50 is complete. In embodiments, an axial length 82 of the sleeve 80 may be sufficiently long such that upon a complete connection of the first member 30 and the second member 50, the sleeve 80 may extend axially beyond the shoulder 34. The sleeve 80 may include an inner diameter 100 with a shape that may correspond with (e.g., be configured to engage) a shape of an outer diameter 38 of the shoulder 34. For example, and without limitation, the sleeve 80 may include a polygonal (e.g., octagonal) inner diameter/surface 100 that may be configured to engage a polygonal (e.g., octagonal) outer diameter/surface 38 of the shoulder 34 (see, e.g., FIG. 8B).

In embodiments, during a connection or assembly process, the forward end 84 of the sleeve 80 may initially contact the shoulder 34 of the first member 30 in a manner/position in which the sleeve 80 and the shoulder 34 are not aligned (e.g., octagonal profiles are not aligned). A snap-fit type of engagement between the sleeve 80 and the nut 60 may be configured (e.g., enlarged, angled, tapered, etc.) to allow at least some axial play/flexibility of the sleeve 80 (e.g., away from the shoulder 34) until the sleeve 80 is aligned with the shoulder 34 (see, e.g., FIG. 8).

In embodiments, the shoulder 34 of the first member 30 may include a spline profile/feature that may correspond to a spline profile/feature of the forward end 84 of the sleeve 80 (e.g., in a similar manner described in connection with spline 66). In such configurations, relative motion between the sleeve 80 and the first member 30 may be limited and/or prevented. A splined interaction/engagement between the shoulder 34 and the sleeve 80 may control a minimum torque required for tightening and/or loosening the nut 60.

Figure 7:
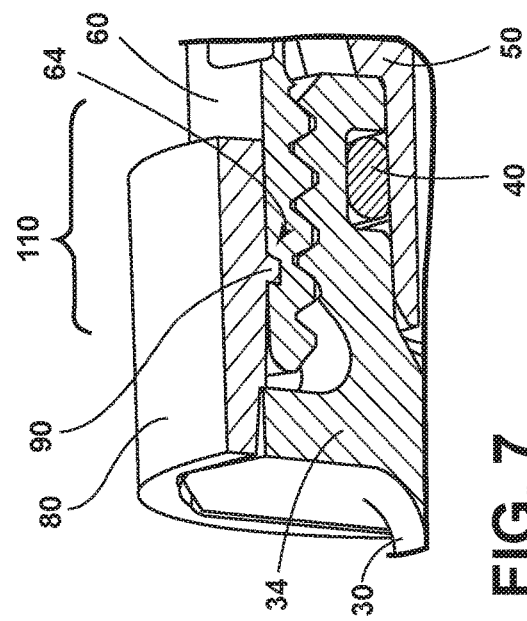
FIG. 7 is a cross-sectional perspective view generally illustrating portions of an embodiment of a connected coupling, in accordance with teachings of the present disclosure.

With embodiments, such as generally illustrated in FIGS. 6 and 7, a coupling 20 may include, in an assembled/connected configuration, an overlapping section 110 in which some or all of the first member 30, the second member 50, the nut 60, and the sleeve 80 overlap (e.g., in a radial direction).

In embodiments, a method of assembling a coupling 20 may include providing a first member 30 and a second member 50. A sleeve 80 and a nut 60 may be connected with the second member 50. The nut 60 may include internal threads 62 that may be configured to engage external threads 32 of the first member 30. The nut 60 and the first member 30 may be threaded/screwed together until the sleeve 80 covers, at least in a radial direction, a shoulder 34 of the first member 30.

Relative to other designs, embodiments of the present disclosure may include lower costs, less weight, less insertion depth, fewer components/pieces, and/or an improved visual indication/assurance of a connection.

Figure 9:
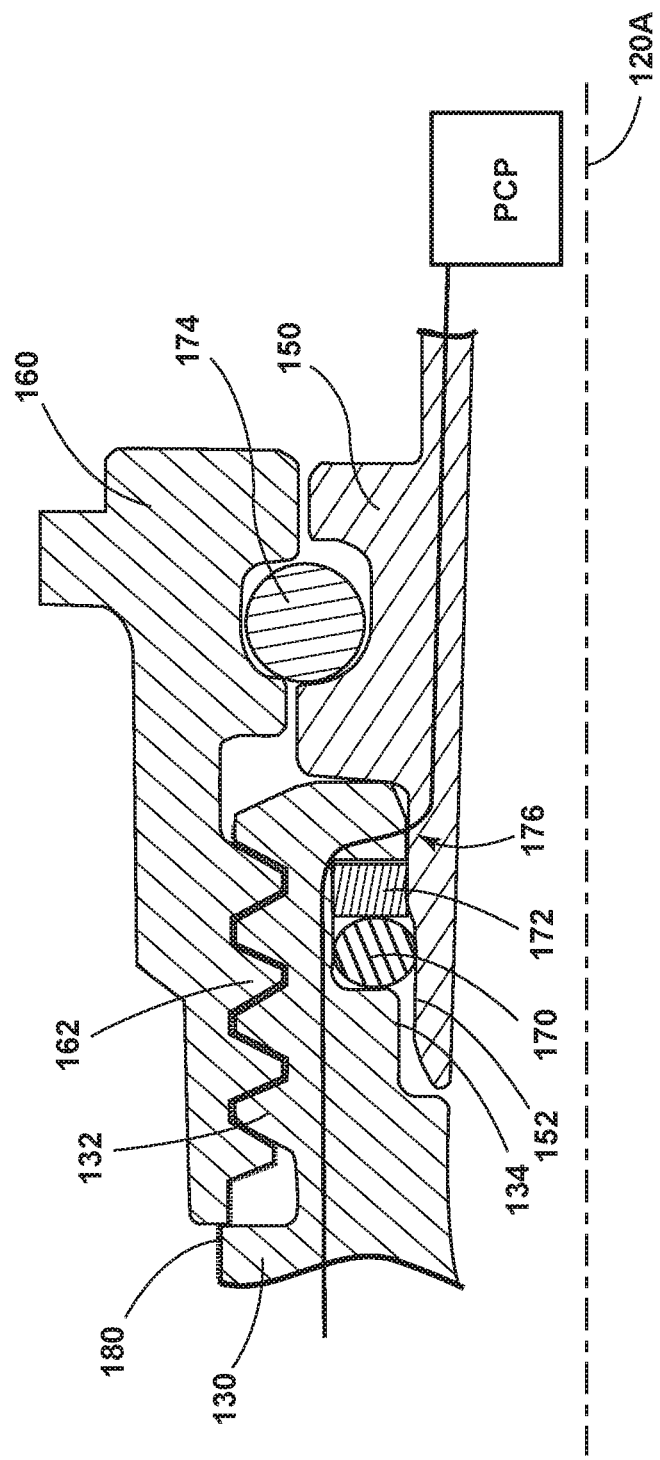
FIG. 9 is a side cross-sectional view generally illustrating an embodiment of a coupling in accordance with teachings of the present disclosure.

In embodiments, such as generally illustrated in FIG. 9, a fluid coupling/fitting 120 may include a first member 130 (e.g., a male adapter), a second member 150 (e.g., a female adapter), and/or a nut 160. Coupling/fitting 120 may include a longitudinal axis 120A. In embodiments, the first adapter 130 may include threads 132 that may be configured to engage threading 162 associated with a nut 160. Embodiments of a fluid coupling 120 may also include, for example and without limitation, one or more seals (e.g., illustrated seal 170), a back-up ring 172, and/or a drive wire 174. In the illustrated embodiment, a primary conductive path (e.g., an electrically conductive path) is generally represented by the line designated PCP, and an area of contact between the male adapter 130 and the female adapter 150 is generally designated as 176.

Since the input force associated with the connection of a hand-tightened coupling may be physically limited (e.g., a human being may be able to generate a relatively limited amount of force), with embodiments, a mechanical/structural advantage may be employed to amplify the force and/or torque associated with hand installation. Such an amplification can involve the threading 132, 162 associated with an embodiment of a coupling 120, and may further involve a wedge provided or disposed on a leading edge of at least one fitting adapter (e.g., of the male adapter 130 and/or the female adapter 150). While threads (e.g., threads 132, 162) are disclosed, the coupling/assembly 120 is not limited to the inclusion of threads. Consequently, other elements/features that may, inter alia, also or alternatively provide an axial mechanical connection advantage, whether part of the assembly and/or external processes, may be employed. Moreover, if or how much mechanical advantage is involved or included with a coupling/assembly 120 may be dependent upon, and/or adjusted by, tolerances associated with a male adapter 130 and/or a female adapter 150.

In embodiments, such as generally disclosed, a female adapter 150 can radially generate sufficiently high contact force with a male adapter 130 and maintain such force while permitting axial travel. It is noted that there can be a relatively small overlap between a maximum amount of an interference force between adapters 130, 150 that can be overcome by hand, and a minimum amount of force to achieve a sufficient conductivity. Moreover, with some applications, it can be commercially cost prohibitive to design tolerances and manufacture adapters 130, 150 that maintain minimum contact interference and allow the adapters 130, 150 to be joined by hand. In some embodiments, an interference may be continuous or substantially continuous, for example, involving a plurality of contact points that are substantially continuous (e.g., may comprise a substantially continuous ring).

In embodiments of the disclosure, which may address such challenges, adapters 130, 150 may have clearances 178 between their average diameters, and at least one of the adapters 130, 150 may be configured to have an out-of-roundness condition that is intentionally induced in at least one of the interfacing surfaces/diameters 134, 152. In applications, when joined, such a configuration can create localized interferences. The localized interferences may be associated with a plurality of corresponding contact points CP, such as those disclosed further herein. Such localized interferences may, for example, reduce an overall stiffness or interference force associated with an interference fit (e.g., interference between a male adapter 130 and a female adapter 150, as generally illustrated in the depicted embodiment). For example and without limitation, localized interferences may provide areas of relatively high interference force while other areas may include clearances 178 such that a total interference/connection force is reduced. An adapter 130, 150 may be manufactured to have comparatively larger tolerances in connection with an application with a given/anticipated connection force. That is, with embodiments of the present disclosure, greater tolerances may be associated with an adapter 130, 150 while yet permitting assembly or connection with a sufficient conductive path PCP and with a comparatively lesser force (e.g., hand tightening). It is noted that for some applications/embodiments, features that increase mechanical advantage, such as threading, can increase associated/allowable tolerance ranges for components, such as adapters 130, 150, even in view of a comparatively reduced connection/assembly force. For example only and without limitation, in an embodiment of a coupling 120 involving hand tightening, a radial interference of about 0.001 inch may be involved. Comparatively, for a similar embodiment that involves a mechanical advantage force, the associated radial interference may be increased or expanded to 0.005 inch.

Figure 10:
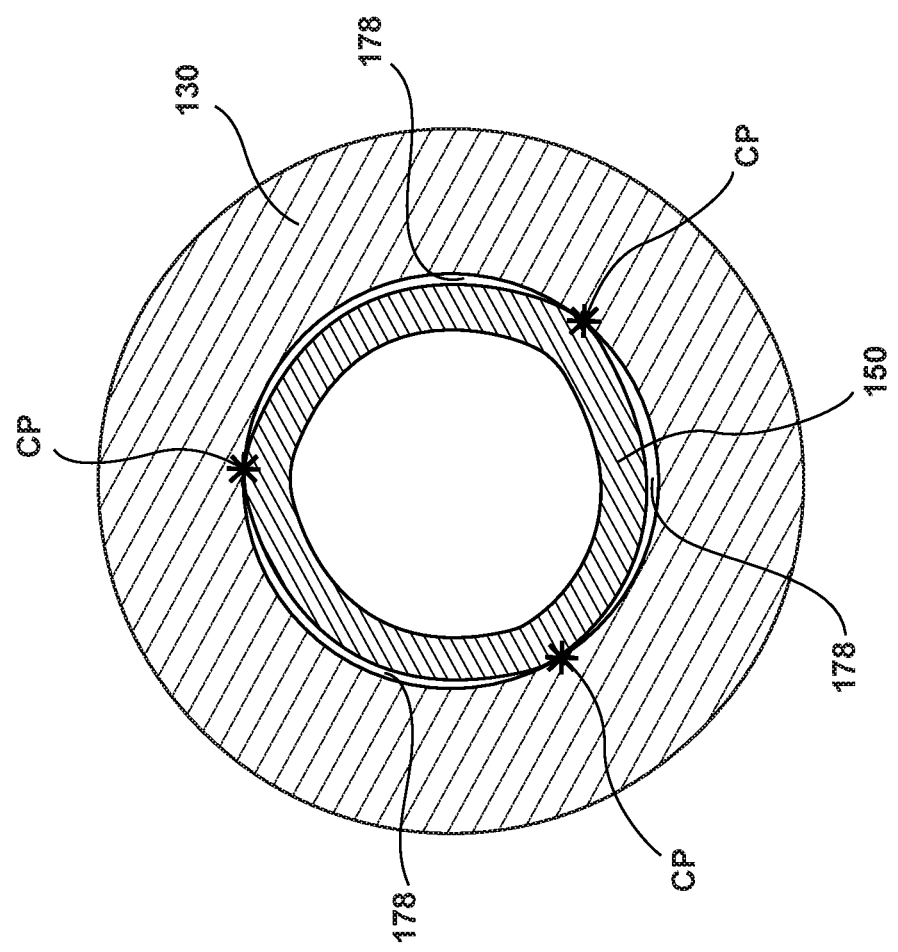
FIG. 10 is a cross-sectional view of a portion of the system shown in FIG. 9 viewed along A-A.

An embodiment of such an out-of-roundness configuration is generally illustrated in FIG. 10. A cross-section of the male adapter 130 and the female adapter 150 are generally depicted with the female adapter 150 having a female adapter outer diameter 152 and the male adapter 130 having a male adapter inner diameter 134. In embodiments, the male adapter 130 may have a male adapter inner diameter 134 with generally tight roundness—for example, about 0.0005 inches. With embodiments, a corresponding female adapter 150 may have an average female adapter outer diameter 152 that results in a clearance 178 with the male adapter inner diameter 134, at least in some sections. However, at least one of the female adapter 150 and the male adapter 130 may be held/formed intentionally out-of-round, which may result in a plurality of intended contact points CP between the male adapter 130 and the female adapter 150. Contact points CP may provide an electrical connection or conductivity between adapters 130, 150. With the contact points, a gap may close up as contact points translate, to a degree, radially inward. Such movement can, to some extent, serve as a spring. In embodiments, a minimum amount of contact area may be provided. However, for a number of applications, such contact area may not exceed an undesirable amount of contact stress—at least not to the degree that the part/components are unacceptably modified.

For embodiments/applications, average diameter requirements can generally be met and may be sufficiently repeatable employing known machining operations, e.g., CNC (computer numerical control) turning. Out-of-roundness may, for example and without limitation, be created or induced in the female adapter outer diameter 152 by holding the female adapter 150 in a multi jaw chuck and excess (but controlled) clamping force may be applied while turning the female adapter outer diameter 152. The introduction of an intentional out-of-roundness in connection with the female adapter 150 may, to a degree, turn the female adapter 150 into a form of spring. In embodiments, the roundness of the female adapter outer diameter 152 may have its roundness kept within the elastic range of the material.

The embodiment illustrated in FIGS. 9 and 10 discloses the inner component—e.g., the female adapter 150—formed to have a female adapter outer diameter/surface 152 that is intentionally out-of-round. However, in embodiments, the outer component—e.g., the male adapter 130—may be formed to have a male adapter inner diameter/surface 134 that is intentionally out-of-round and/or the inner component (e.g., the female adapter 150) may be controlled within conventional roundness expectations so as to provide for the generation of localized interferences.

It is also noted that while three intentional contact points CP are included in the illustrated embodiment, the inventive concept is not limited to that number, and more or less contact points CP may be employed. In general, with a lower the number of contact points, the coupling 120 may be the less stiff, and vice versa.

Moreover, the out-of-roundness form can be manufactured via a number of methods, including but not limited to: (a) restraining the part in a multi jaw and inducing a desired out-of-roundness by monitoring the jaw deflection, or the input pressure/torque applied to the chuck, (b) using a collet with an inner diameter that has the same out-of-round form ground into it, when a roughed out component is clamped in the collet an out-of-round form is induced, (c) employing a CNC ID or OD grinder, (d) employing CNC milling, and/or (e) using a CNC lathe with cam-turning capability.

With embodiments, a coupling 120 may provide for the creation of an interference fit in an economical manner in environments that do not have an excessive amount of force to engage an interference fit (such as where hand tightening may be involved).

Additionally, to address some concerns, such as galling at an interface between male and female adapters 130, 150 during applications, a coating 180 may be utilized to, for example, increase the relative hardness while minimizing an impact to the surface resistance. For example and without limitation, in an embodiment a coating 180 may be applied on threads and/or at least a portion of the conductive interface. Such a coating 180 may, for example and without limitation, comprise titanium nitride.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." throughout the specification is to be construed broadly and is used to provide non-limiting examples of embodiments of the disclosure, and the disclosure is not limited to such examples. Uses of "and" and "or" are to be construed broadly (e.g., to be treated as "and/or"). For example, and without limitation, uses of "and" do not necessarily require all elements or features listed, and uses of "or" are intended to be inclusive unless such a construction would be illogical.

It is intended that all matter contained in the above description or shown in the accompanying drawings shall be interpreted as illustrative only and not limiting. Changes in detail or structure may be made without departing from the present disclosure.

Furthermore, the mixing and matching of features, elements and/or functions between various examples is expressly contemplated herein so that one of ordinary skill in the art would appreciate from this disclosure that features, elements, and/or functions of one example may be incorporated into another example as appropriate, unless described otherwise, above. Moreover, many modifications may be made to adapt a particular situation or material to the teachings of the present disclosure without departing from the scope thereof. Therefore, it is intended that the present teachings not be limited to the particular examples illustrated by the drawings and described in the specification, but that the scope of the present disclosure will include any embodiments falling within the foregoing description and the appended claims.

What is claimed:

1. A fluid coupling, comprising:
   a first member configured for connection with a first fluid conduit, the first member including a shoulder;
   a second member configured for connection with a second fluid conduit;
   a nut; and
   a sleeve engaged with the nut to restrict axial movement of the sleeve relative to the nut and enable rotational movement of the sleeve with respect to the nut, and configured to cover the shoulder upon a complete connection of the first member with the second member;
   wherein the nut includes a circumferential groove and the sleeve includes a radially-extending circumferential flange that, when engaged with one another, the radially-extending circumferential flange is rotatable within the groove to enable the rotational movement of the sleeve with respect to the nut, while the circumferential groove restricts axial movement of the radially-extending circumferential flange to restrict the axial movement of the sleeve relative to the nut wherein the circumferential groove includes a stepped portion and the radially-extending circumferential flange includes a shoulder portion that corresponds to the stepped portion when the circumferential groove and the radially-extending groove are engaged with one another.

2. The fluid coupling of claim 1, wherein the sleeve includes a polygonal inner surface corresponding to a polygonal outer surface of the shoulder.

3. The fluid coupling of claim 1, wherein the shoulder includes a visual indicator at an outer radial surface of the shoulder.

4. The fluid coupling of claim 1, wherein the sleeve is keyed with the nut such that the sleeve can rotate relative to the nut and axial movement of the sleeve relative to the nut is restricted.

5. The fluid coupling of claim 1, wherein the first member includes an external thread and the nut includes an internal thread corresponding to the external thread of the first member.

6. The fluid coupling of claim 1, wherein an axial length of the sleeve is at least 40% less than an axial length of the nut.

7. The fluid coupling of claim 1, wherein the stepped portion and the shoulder portion are arranged at an incline.

8. The fluid coupling of claim 1, wherein at least one of the shoulder and the sleeve include a tapered edge to facilitate engagement between the shoulder and the sleeve.

9. The fluid coupling of claim 1, wherein the sleeve includes an internal spline profile configured to engage an external spline profile of the nut.

10. The fluid coupling of claim 9, wherein the internal spline profile includes alternating curved protrusions and curved recesses.

11. The fluid coupling of claim 1, wherein the fluid coupling includes an overlapping section in which all of the sleeve, the nut, the first member, and the second member overlap with each other in a radial direction.

12. The fluid coupling of claim 1, wherein the shoulder of the first member includes a spline profile corresponding to a spline profile of a forward end of the sleeve.

13. The fluid coupling of claim 1, wherein none of the first member, the second member, the nut, and the sleeve are connected to a ratchet ring or a sleeve spring.

14. The fluid coupling of claim 1, wherein one or more contact points are provided between the first member and the second member, and at least one of the first member and the second member is out-of-round.

15. A fluid coupling, comprising:
a first member configured for connection with a first fluid conduit, the first member including a shoulder;
a second member configured for connection with a second fluid conduit;
a nut; and
a sleeve engaged with the nut to restrict axial movement of the sleeve relative to the nut and enable rotational movement of the sleeve with respect to the nut, and configured to cover the shoulder upon a complete connection of the first member with the second member;
wherein the nut includes a circumferential groove and the sleeve includes a radially-extending circumferential flange that, when engaged with one another, the radially-extending circumferential flange is rotatable within the groove to enable the rotational movement of the sleeve with respect to the nut, while the circumferential groove restricts axial movement of the radially-extending circumferential flange to restrict the axial movement of the sleeve relative to the nut; wherein the sleeve includes an internal spline profile disposed at an axial end of the circumferential groove facing the second member, and configured to engage an external spline profile of the nut disposed at an axial end of the radially-extending circumferential flange facing the second member.

16. A fluid coupling, comprising:
a first member configured for connection with a first fluid conduit, the first member including a shoulder;
a second member configured for connection with a second fluid conduit;
a nut; and
a sleeve engaged with the nut to restrict axial movement of the sleeve relative to the nut and enable rotational movement of the sleeve with respect to the nut, and configured to cover the shoulder upon a complete connection of the first member with the second member;
wherein the nut includes a circumferential groove and the sleeve includes a radially-extending circumferential flange that, when engaged with one another, the radially-extending circumferential flange is rotatable within the groove to enable the rotational movement of the sleeve with respect to the nut, while the circumferential groove restricts axial movement of the radially-extending circumferential flange to restrict the axial movement of the sleeve relative to the nut; wherein the sleeve includes an internal spline profile disposed at an axial end of the circumferential groove facing the second member, and configured to engage an external spline profile of the nut disposed at an axial end of the radially-extending circumferential flange facing the second member; and wherein the circumferential groove includes a stepped portion and the radially-extending circumferential flange includes a shoulder portion that corresponds to the stepped portion when the circumferential groove and the radially-extending groove are engaged with one another.

* * * * *